US006519083B2

(12) United States Patent
Heinrich

(10) Patent No.: US 6,519,083 B2
(45) Date of Patent: Feb. 11, 2003

(54) POWER FOCUSING DEVICE FOR A TELESCOPIC SIGHT

(76) Inventor: James A. Heinrich, 109 Sunrise Dr., Box 165, Medford, MN (US) 55049

( * ) Notice: Subject to any disclaimer, the term of this patent is extended or adjusted under 35 U.S.C. 154(b) by 0 days.

(21) Appl. No.: 09/916,659

(22) Filed: Jul. 26, 2001

(65) Prior Publication Data

US 2002/0122248 A1 Sep. 5, 2002

Related U.S. Application Data

(60) Provisional application No. 60/258,668, filed on Dec. 28, 2000, and provisional application No. 60/220,743, filed on Jul. 26, 2000.

(51) Int. Cl.[7] .............................................. G02B 23/00
(52) U.S. Cl. ........................ 359/422; 359/425; 42/119
(58) Field of Search ................. 359/399, 407, 359/418, 421, 422, 425, 426, 427, 432; 42/119, 135

(56) References Cited

U.S. PATENT DOCUMENTS

| 4,290,219 A | 9/1981 | Boller et al. |
| 4,309,095 A | 1/1982 | Buckley |
| 5,020,262 A | 6/1991 | Pena |
| 5,111,587 A | 5/1992 | Plank |
| 5,180,875 A | 1/1993 | Berry, Jr. et al. |
| 5,181,323 A | 1/1993 | Cooper |
| 5,276,554 A | 1/1994 | Nassivera |
| 5,521,757 A | 5/1996 | Olson |
| 5,528,847 A | 6/1996 | Fisher et al. |
| 5,550,754 A * | 8/1996 | McNelley et al. ........ 348/14.01 |
| 5,625,954 A | 5/1997 | DePaoli |
| 5,924,211 A | 7/1999 | Wambold, Jr. et al. |
| 6,226,880 B1 | 5/2001 | Pitre |

OTHER PUBLICATIONS

Holtek HT6751A/B, Camera Motor Driver (1.5 Channel), pp. 1–5, dated Aug. 7, 2000.
Holtek HT12A/HT12E, $2^{12}$ Series of Decoders, pp. 1–12 dated Apr. 11, 2000.
Holtek $2^{12}$ Series of Decorders, pp. 1–9, dated Jul. 12, 1999.
Panasonic Photo IC, PNA4611M Series (PNA4611M/4612M/4613M/4614M/4620M), Bipolar Integrated Circuit with Photodetection Function, pp. 1–4, not dated.

* cited by examiner

Primary Examiner—Mark A. Robinson
(74) Attorney, Agent, or Firm—Patterson, Thuente, Skaar & Christensen, P.A.

(57) ABSTRACT

A motorized, finger operated mechanism for focusing or otherwise adjusting a telescopic sight. The power focusing device generally includes a battery powered motorized focus mechanism operably attachable to the focusing ring of a telescopic sight, a wireless receiver and a wireless controller. The operator controls the focusing mechanism by manipulation of the controller. The focus mechanism includes a motor, a reduction drive, a power source and a device to engage the focusing ring. The focus mechanism may be secured to an existing telescopic sight or integrated into the telescopic sight design.

18 Claims, 4 Drawing Sheets

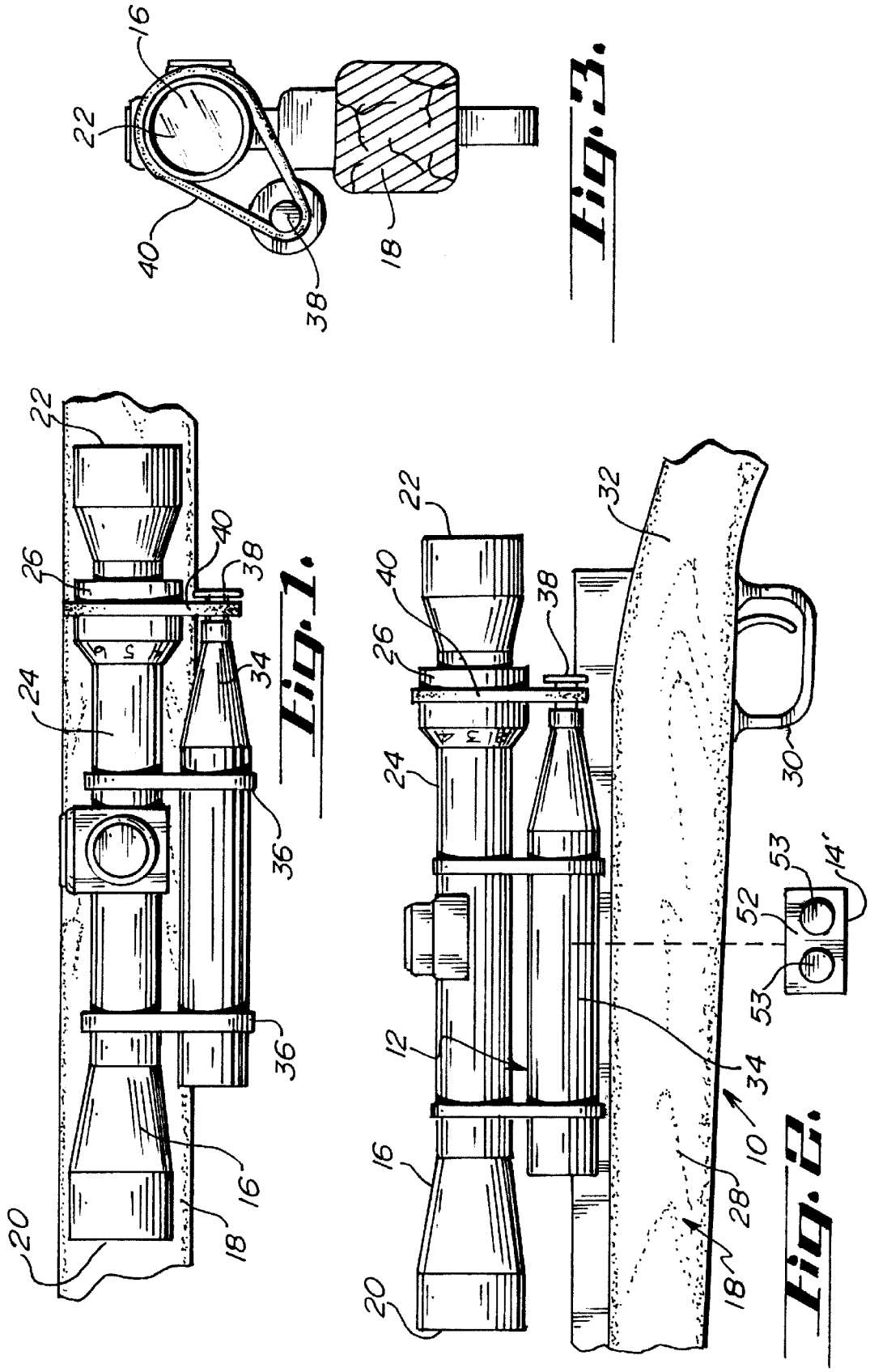

POWER FOCUSING DEVICE FOR A TELESCOPIC SIGHT

RELATED APPLICATION

The present application claims the benefit of U.S. Provisional Application Nos. 60/258,668, filed Dec. 28, 2000, and 60/220,743, filed Jul. 26, 2000, both applications being incorporated herein in their entirety by reference.

FIELD OF THE INVENTION

The invention relates to an attachment for a telescopic sight for a firearm that enables focusing of the sight without removing the hand from the normal shooting position. The invention may be adapted for any other focusable optical device.

BACKGROUND OF THE INVENTION

When using a gun with a telescopic sight it is often necessary to focus the sight for targets at different shooting distances. Commonly, the telescopic sight has a focusing ring near the ocular end for accomplishing this task.

To focus currently available telescopic sights, one hand must be removed from its shooting position and used to manipulate the focusing ring. This movement disturbs the marksman's concentration and may induce loss of sight of the target. In the case of a hunter stalking game it may create enough movement or noise to spook the game. Additionally, game is often barely seen among foliage or other obstructions. Losing sight of the game momentarily may result in loss of the opportunity to take a shot at it.

A variety of efforts have been made to address this problem. For example, U.S. Pat. No. 5,180,875 issued to Berry, Jr. et al. relates to a scope adjustment for firearms including a thumb wheel for focusing the scope with the marksman's trigger hand.

U.S. Pat. No. 5,276,554 issued to Nassivera discloses a magnification adjustment system for a variable power rifle scope. The device includes a multi-purpose lever which may be manipulated by the thumb of a marksman's trigger hand for adjusting the focus of the scope.

U.S. Pat. No. 5,521,757 issued to Olson relates to an adjustment lever that may be pushed to rotate the adjustment ring.

U.S. Pat. No. 5,528,847 issued to Fisher et al. discloses a variable power telescopic sight.

U.S. Pat. No. 5,020,262 issued to Pena describes a camera mount for rifle scopes whereby the camera is activated when the rifle trigger is pulled.

U.S. Pat. No. 4,290,219 issued to Boller et al. teaches a target sight recording apparatus.

U.S. Pat. No. 5,942,211 discloses a clamping ring with an extended handle dimensioned to be secured to the adjustment ring on a rifle scope. The extended handle includes a remote ring for receiving a finger to manipulate the adjustment ring. All of the above mentioned patents disclose devices that must be manipulated by the marksman's trigger hand. This still tends to break the marksman's concentration and may create enough movement to spook game. Also, many of these devices create substantial obstruction in the area of the rifle where the marksman may need to manipulate either a bolt action or other mechanical parts of the firearm.

The '211 patent also discloses but does not claim a battery operated motor and wired switch assembly that is connectable to the adjustment ring of a scope. The switch may be located on the firearm and manipulated as needed to adjust the scope. This approach is limited by the encumbrance of the wired switch. The wires must be run from the switch assembly to the motor and may interfere with the operation of the moving parts of the weapon. Further, the wired switch is difficult to relocate as desired, for example, a variety of marksmen might use a single firearm each desiring a different location for the switch.

It would be beneficial for a marksman to be able to focus a telescopic sight while keeping his hands in place on the weapon stock and without disturbing the marksman's aim or his potential target. Further, it would be beneficial if the controller for the focusing mechanism A could be placed at any desired location on the firearm and not create obstruction involved in mechanical or wired connection to the scope.

SUMMARY OF THE INVENTION

The present invention solves the above noted problems by providing a motorized, finger operated mechanism for focusing a telescopic sight. The power focusing device generally includes a battery powered motorized focus mechanism operably attachable to the focusing ring of a telescopic sight, a wireless receiver and a controller. The operator controls the focusing mechanism by manipulation of the controller.

The focus mechanism includes a motor, a reduction drive, a power source and a device to engage the focusing ring. The focus mechanism may be secured to an existing telescopic sight or integrated into the telescopic sight design.

The controller includes a switch by which the focus mechanism may be operated in either of two directions. The controller may be positioned in any location convenient to the fingers of the marksman. An additional focus mechanism may be employed to operate a different sight function, for example, to operate a zoom mechanism. The wireless receiver receives commands from the controller, preferably via infrared media. The receiver includes a motor driver that activates the motor in response to the command received and adjusts the telescopic sight parameter in response.

Thus, the operator of the power focusing device may adjust the focus, zoom or other parameter of a telescopic sight without significant movement that is likely to disturb his aim or spook the game that is his intended target.

GRIEF DESCRIPTION OF THE DRAWINGS

FIG. 1 is a top plan view of a power focus attachment as utilized on a telescopic rifle sight;

FIG. 2 is a side plan view of the power focus attachment as utilized on a rifle mounted telescopic sight;

FIG. 3 is a rear plan view of the power focus attachment as utilized on a rifle mounted telescopic sight;

DETAILED DESCRIPTION OF THE INVENTION

Figure 4:
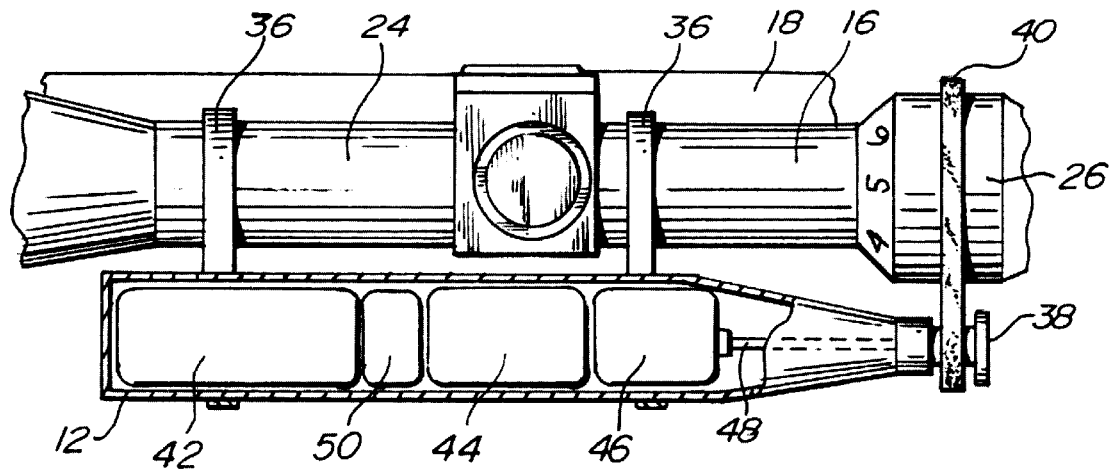
FIG. 4 is a fragmentary sectional view of the housing and contents.

The power focusing device 10 depicted in FIGS. 1, 2 and 3 generally includes a focuser 12 and a controller 14. The controller 14 is mounted on a telescopic sight 16 which is in turn mounted on a firearm 18. The firearm 18 may be a rifle, a hand gun or another similar weapon such as a crossbow. The firearm 18 described and depicted herein is a rifle but this should not be construed as limiting. Additionally, this application will refer to focusing the telescopic sight, however, it is to be understood that the power focusing device may be used to control any adjustable parameter of the scope. These may include a zoom mechanism, windage adjustment or elevation adjustment. The power focusing device 10 is intended to be universally adaptable to telescopic sights and spotting scopes.

The telescopic sight 16 includes an objective lens 20, an eyepiece 22, a barrel 24 and a focusing ring 26. The firearm 18 includes a forestock 28, a trigger guard 30 and a pistol grip 32.

The focuser 12 includes a housing 34, brackets 36, a pulley 38 and a belt 40. The housing 34 is secured to the barrel 24 of the telescopic sight 16 via brackets 36. Pulley 38 is operably engaged to focusing ring 26 by belt 40. Belt 40, focusing ring 26 and pulley 38 may include meshing teeth (not shown).

Referring to FIG. 4, enclosed within housing 34 are power supply 42, motor 44, reduction drive 46 and power shaft 48. Motor 44 is reversible. Power supply 42 is electrically connected to motor 44. Motor 44 turns reduction drive 46 which in turn rotates power shaft 48 which is operably connected to pulley 38. Housing also contains wireless receiver 50.

Power supply 42 may be a battery or other power source. The motor 44 and reduction drive 46 are preferably a Maxon A max 119070 p07 motor and a Maxon A max 122.6:1 gear head.

The controller 14 includes a switch 52. The switch 52 may be any switch with two momentarily closed positions. Advantageously, switch 52 includes two momentary contact push button switches 53. The first closed circuit activates focuser 12 in a first direction. The second closed position activates focuser 12 in a direction opposed to the first. Preferably, switch 52 includes two momentary push button contact switches each activating the focuser in one direction. Another style of switch may also be employed so long as it allows an appropriate number of momentary contact circuits for the desired focuser functions.

The controller 14 may be placed in any location on or near to the firearm 18 that is readily reachable by the marksman. For example, the controller may be conveniently located on or in the vicinity of the trigger guard 30 and controlled by the marksman's trigger finger (not shown). Preferably, the controller 14 may be located on the forestock 28 or pistol grip 32 of a rifle or pistol in any location convenient to the marksman.

The controller 14 may be hardwired to the focuser 12, or preferably employs wireless technology and a wireless receiver 50.

Wireless controller 14 transmits a signal received by wireless receiver 50 to activate the focuser 12 for each direction of rotation. A radio frequency transmitter and receiver may be employed. The frequency is preferably non-regulated with a maximum range of ten feet. Infrared technology is preferred to reduce the possibility of interference between multiple power focusing devices 10 which may be operated in the same vicinity.

Figure 5:
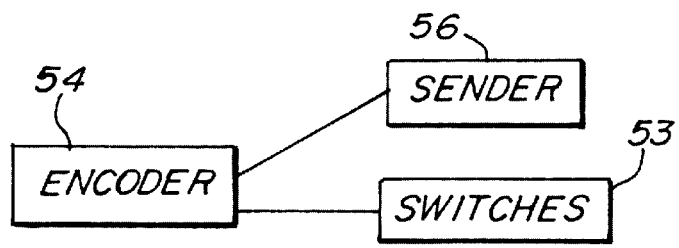
FIG. 5 is a block diagram of a controller as utilized in the present invention.

Referring to FIG. 5 wireless controller 14 preferably includes encoder 54, sender 56, power source 58, and two switches 53. Encoder 54 preferably employs low power, high noise immunity CMOS technology and is capable of encoding information which consists of N address bits and 12-Ndata bits.

Encoder 54 encodes a command signal. Sender 56 sends a signal via RF or preferably infrared radiation. Power source 58 supplies power to encoder 54 and sender 56. Switches 53 close their respective circuits to initiate encoder 54 encoding a signal.

Figure 8:
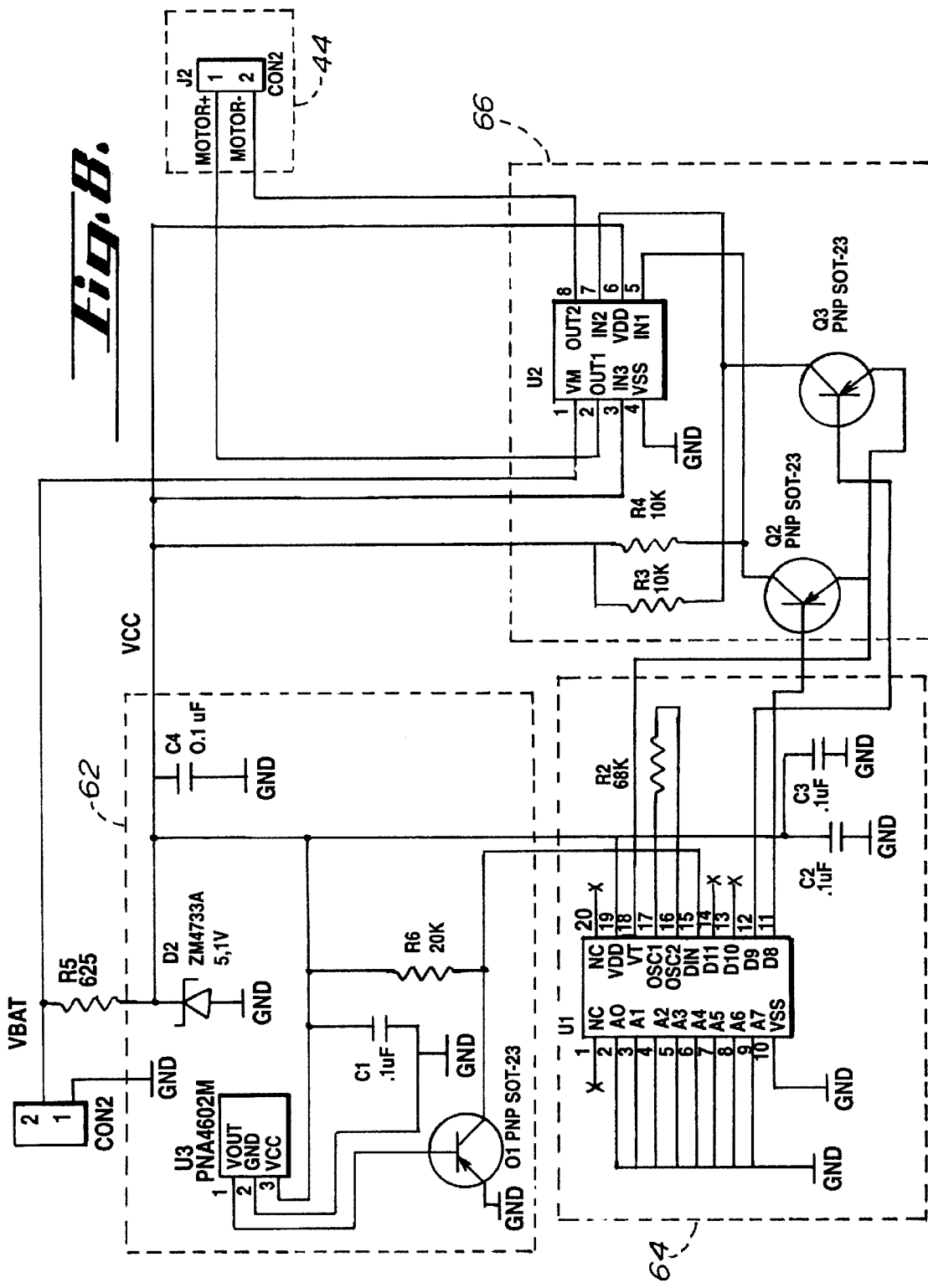
FIG. 8 is an exemplary schematic circuit diagram of the wireless receiver of FIG. 7.

FIG. 8 schematically depicts a detailed circuit as utilized in one embodiment wherein encoder 54, sender 56, power source 58, and two switches 53 are identified by like reference numerals. As shown in this embodiment, encoder 54 may be a an HT12A or equivalent manufactured by Holtek Semiconductor, Inc. located at No. 3 Creation Road II, Science -based Industrial Park, Hsinchu, Taiwan, R.O.C. This encoder is described in a document entitled HT12A/HT12E $2^{12}$ Series of Encoders published Apr. 11, 2000, which is incorporated herein in its entirety by reference.

Figure 6:
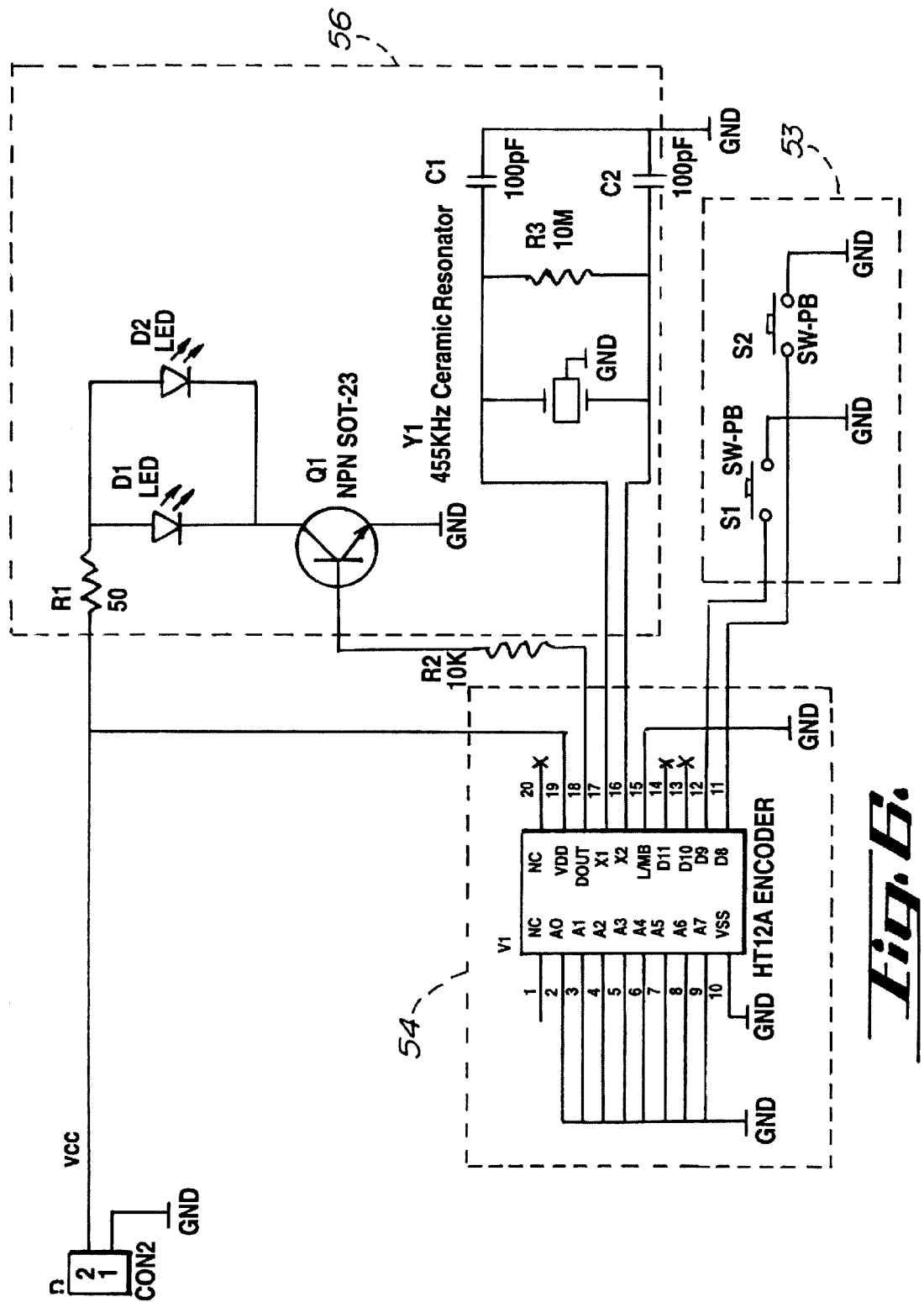
FIG. 6 is an exemplary schematic circuit diagram of the controller of FIG. 5.

A detailed circuit of one embodiment of the invention is schematically depicted in FIGS. 6 and 8. Those skilled in the art may employ other circuits without departing from the spirit and scope of the invention.

Figure 7:
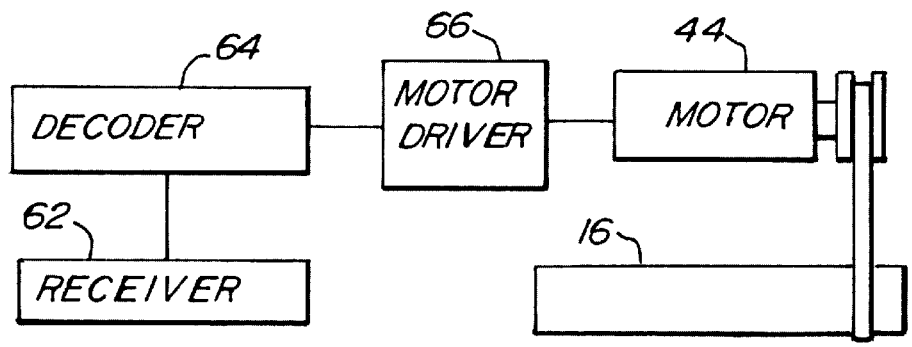
FIG. 7 is a block diagram of a wireless receiver as utilized in the present invention.

Referring to FIG. 7, wireless receiver 50 generally includes receiver 62, decoder 64 and motor driver 66 and is operably connected to motor 44. Receiver 62 receives a signal which is decoded by decoder 64 which in turn activates motor driver 66 to control motor 44. A detailed example circuit of an embodiment is schematically depicted in FIG. 8 wherein components are identified by like reference numerals. Other circuits may be employed without departing from the spirit and scope of the invention.

As depicted in FIG. 8, receiver 62 is preferably a bipolar integrated circuit with photo detection function such as a Panasonic PNA4612M or equivalent as described in a document entitled *Photo IC PNA4611M Series* which is incorporated herein in its entirety by reference. Decoder 64 is preferably a Holtek HT12D integrated circuit as described in a document entitled $2^{12}$ Series of Decoders published Jul. 12, 1999 which is incorporated herein in its entirety by reference. Motor driver 66 is preferably a Holtek HT6751A or equivalent as described in a document entitled *HT6751A/B Camera Motor Driver* (1.5 Channel) published Aug. 7, 2000 which is incorporated herein in its entirety by reference.

As is apparent in FIGS. 1 through 4, the focuser 12 is connected to the focusing ring 26 via pulley 38 and belt 40. Other approaches, such as friction wheels, gears, and sprocket and chains may be employed without departing from the spirit and scope of the invention.

The power focusing device 10 is depicted in FIGS. 1 through 4 as an attachment to an existing telescopic sight 16. However, it is specifically contemplated that the power focusing device 10 may be integrated into a telescopic sight as a power focusing telescopic sight unit.

In operation, the focuser 12 is mounted to the telescopic sight 16 via brackets 36. The controller 14 is mounted on the firearm 18 at a location preferred by the marksman that will use it. The belt 40 is engaged around focusing ring (adjuster) 26 and pulley 38. The firearm 18 is then sighted as usual through eyepiece 22. The marksman may activate switch 52 as desired to focus the telescopic sight 16 on the target (not shown) or adjust any other parameter of the sight.

Upon activation of switch 52 in a first direction encoder 54 generates a signal and delivers it to sender 56. Sender 56 converts the signal to RF or infrared radiation and transmits it. This signal is received by receiver 62, converted to electrical impulses and sent to decoder 64. Decoder 64 decodes the signal command and activates motor driver 66 in the desired direction to control motor 44. Motor 44 then drives reduction gear 46 which in turn adjusts an adjustable parameter of scope 16 such as focuser 12.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A system for power adjusting a telescopic sight, comprising:
    a power supply;
    a reversible motor operably connected to said power supply;
    a reduction drive operably interconnecting said motor to said telescopic sight whereby an adjustable parameter of the telescopic sight is manipulable;
    a wireless controller/transmitter operable by an operator and adapted to be readily securable in the vicinity of a firearm, the wireless controller being capable of providing at least two commands, the wireless controller/transmitter having an effective range of less than ten feet;
    a wireless receiver in operable communication with said wireless controller/transmitter and operably connected to the motor so as to allow manipulation of the adjustable parameter as desired by the operator.

2. The system as claimed in claim 1, in which the wireless controller is in communication with the wireless receiver via infrared signals.

3. The system as claimed in claim 1, in which the wireless controller is in communication with the wireless receiver via radio frequency signals.

4. The system as claimed in claim 1, in which the adjustable parameter manipulated is focus.

5. The system as claimed in claim 1, in which the adjustable parameter manipulated is a zoom mechanism.

6. The system as claimed in claim 1, in which the wireless controller includes two momentary contact push button switches.

7. The system as claimed in claim 1, said reduction drive further comprising a pulley and belt system for operably interconnecting said reduction drive and said telescopic sight.

8. A method of adjusting an adjustable parameter of a telescopic sight, the method comprising the steps of:
    operably connecting a power supply to a motor and reduction drive;
    operably connecting the reduction drive to an adjustable parameter of the telescopic sight;
    operably connecting a wireless receiver to the motor whereby the motor may be operated in two directions;
    generating a command from a wireless controller;
    transmitting the command to the wireless receiver whereby the wireless receiver commands the motor to adjust the adjustable parameter of the telescopic sight; and
    adjusting the adjustable parameter as desired by an operator.

9. The method as claimed in claim 8, in which the wireless controller is in communication with the wireless receiver via infrared signals.

10. The method as claimed in claim 8, in which the wireless controller is in communication with the wireless receiver via radio frequency signals.

11. The method as claimed in claim 8, in which the adjustable parameter manipulated is focus.

12. The method as claimed in claim 8, in which the adjustable parameter manipulated is a zoom mechanism.

13. The method as claimed in claim 8, in which the wireless controller includes two momentary contact push button switches.

14. The method as claimed in claim 8, said reduction drive further comprising a pulley and belt system for operably interconnecting said reduction drive and said telescopic sight.

15. A system for power adjusting a telescopic sight, comprising:
    a power supply;
    a reversible motor operably connected to said power supply;
    means for operably interconnecting said motor to said telescopic sight whereby an adjustable parameter of the telescopic sight is manipulable;
    means for wireless control of said motor operable by an operator and adapted to be readily securable in the vicinity of a firearm and being capable of providing at least two commands having an effective range of less than ten feet;
    means for wireless receiving of commands in operable communication with said means for wireless control and operably connected to the motor so as to allow manipulation of the adjustable parameter as desired by the operator.

16. The system as claimed in claim 15, in which the means for wireless control and the means for wireless receiving of commands communicate via a medium selected from a group consisting of radio frequency and infrared.

17. The system as claimed in claim 15, in which the adjustable parameter manipulated is selected from a group consisting of focus, zoom, windage, elevation and a combination thereof.

18. The system as claimed in claim 15, in which the means for wireless control includes two momentary contact push button switches.

* * * * *